United States Patent
Vyas et al.

(10) Patent No.: US 9,549,372 B2
(45) Date of Patent: Jan. 17, 2017

(54) ADJUSTING RADIO DORMANCIES IN ELECTRONIC DEVICES BASED ON RECEIPT OF UNSOLICITED INCOMING PACKETS

(71) Applicant: Apple Inc., Cupertino, CA (US)

(72) Inventors: Amit K. Vyas, San Jose, CA (US); Ray L. Chang, Sunnyvale, CA (US); Matthew W. Massicotte, Quincy, MA (US); Madhusudan Chaudhary, Campbell, CA (US); Cherif Jazra, Los Altos, CA (US); Tong Liu, San Diego, CA (US)

(73) Assignee: Apple Inc., Cupertino, CA (US)

( * ) Notice: Subject to any disclaimer, the term of this patent is extended or adjusted under 35 U.S.C. 154(b) by 86 days.

(21) Appl. No.: 13/627,898

(22) Filed: Sep. 26, 2012

(65) Prior Publication Data
US 2013/0329615 A1  Dec. 12, 2013

Related U.S. Application Data

(60) Provisional application No. 61/657,422, filed on Jun. 8, 2012.

(51) Int. Cl.
*G08C 17/00* (2006.01)
*H04L 12/66* (2006.01)
(Continued)

(52) U.S. Cl.
CPC ....... *H04W 52/0229* (2013.01); *H04W 52/028* (2013.01)

(58) Field of Classification Search
CPC ........... H04W 52/0229; H04W 52/028; H04W 40/005; H04L 12/585
See application file for complete search history.

(56) References Cited

U.S. PATENT DOCUMENTS

2006/0002383 A1* 1/2006 Jeong .................... H04L 12/10
                                                370/360
2006/0109846 A1* 5/2006 Lioy et al. ................. 370/389
(Continued)

OTHER PUBLICATIONS

Final Office Action mailed Dec. 3, 2015 for U.S. Appl. No. 13/627,888, filed Sep. 26, 2012; 39 pages.
(Continued)

*Primary Examiner* — Kiet Tang
(74) *Attorney, Agent, or Firm* — Sterne, Kessler, Goldstein & Fox PLLC (57) ABSTRACT

The disclosed embodiments provide a system that processes incoming network packets to an electronic device. The system includes an analysis apparatus that maintains a list of accepted incoming packet attributes for the electronic device based on outgoing packets from the electronic device. The system also includes a management apparatus that uses the list to classify an incoming packet to the electronic device as a solicited incoming packet or an unsolicited incoming packet. If the incoming packet is classified as the solicited incoming packet, the management apparatus enables subsequent processing of the incoming packet on the electronic device. If the incoming packet is classified as the unsolicited incoming packet, the management apparatus adjusts a triggering of radio dormancy in the electronic device based on the incoming packet.

20 Claims, 4 Drawing Sheets

(51) Int. Cl.
*H04L 12/50* (2006.01)
*H04L 12/28* (2006.01)
*H04M 3/42* (2006.01)
*H04W 52/02* (2009.01)

(56) References Cited

U.S. PATENT DOCUMENTS

| | | |
|---|---|---|
| 2009/0006595 A1 | 1/2009 | Abzarian et al. |
| 2009/0161662 A1* | 6/2009 | Wu .................. G06F 1/3203 370/352 |
| 2009/0232039 A1* | 9/2009 | Jung ........................ 370/311 |
| 2010/0293400 A1 | 11/2010 | Kuroishi et al. |
| 2010/0323675 A1* | 12/2010 | Hawkins ................ 455/414.1 |
| 2011/0016519 A1* | 1/2011 | Sauter et al. ................ 726/13 |
| 2013/0329732 A1 | 12/2013 | Vyas et al. |

OTHER PUBLICATIONS

Non-Final Office Action mailed Jun. 4, 2015 for U.S. Appl. No. 13/627,888, filed Sep. 26, 2012; 36 pages.
Final Office Action mailed Oct. 22, 2014 for U.S. Appl. No. 13/627,888, filed Sep. 26, 2012; 36 pages.
Non-Final Office Action mailed Jun. 6, 2014 for U.S. Appl. No. 13/627,888, filed Sep. 26, 2012; 26 pages.

* cited by examiner

ADJUSTING RADIO DORMANCIES IN ELECTRONIC DEVICES BASED ON RECEIPT OF UNSOLICITED INCOMING PACKETS

RELATED APPLICATION

This application claims the benefit of U.S. Provisional Application No. 61/657,422, entitled "Adjusting Radio Dormancies in Electronic Devices Based on Receipt of Unsolicited Incoming Packets," by inventors Amit K. Vyas, Ray L. Chang, Matthew W. Massicote, Madhusudan Chaudhary, Cherif Jazra and Tong Liu, filed 8 Jun. 2012.

The subject matter of this application is related to the subject matter in a non-provisional application by the same inventors as the instant application and filed on the same day as the instant application, entitled "Filtering of Unsolicited Incoming Packets to Electronic Devices," having serial number Ser. No. 13/627,888, and filing date Sep. 26, 2012.

BACKGROUND

Field

The disclosed embodiments relate to processing of network packets. More specifically, the disclosed embodiments relate to techniques for adjusting radio dormancies in electronic devices based on the receipt of unsolicited incoming packets to the electronic devices.

Related Art

Recent improvements in computing power and wireless networking technology have significantly increased the capabilities of electronic devices. For example, laptop computers, tablet computers, portable media players, smartphones, digital media receivers, video game consoles, and/or other modern computing devices are typically equipped with WiFi capabilities that allow the computing devices to retrieve webpages, stream audio and/or video, share desktops and/or user interfaces (UIs), and/or transfer files wirelessly among one another.

To provide such wireless networking capabilities, each electronic device may include a wireless network interface such as a WiFi interface, a cellular network interface, and/or a Bluetooth (Bluetooth™ is a registered trademark of Bluetooth SIG, Inc.) interface. The electronic device may also include a baseband processor and an application processor that implement a network stack on the electronic device. For example, the baseband processor may relay incoming packets from the wireless network interface to the application processor, and the application processor may route the incoming packets to applications on the electronic device. Conversely, the application processor may obtain outgoing packets from the applications and provide the outgoing packets to the baseband processor, and the baseband processor may format the outgoing packets and transmit the outgoing packets over the wireless network interface.

During a sleep mode on the electronic device, the application processor may be powered down, while the baseband processor may remain powered on in a low-power state to detect incoming packets over the wireless network interface and wake the application processor once the incoming packets are received. An unsolicited incoming packet such as a ping packet may thus cause the baseband processor to transition to a higher-power state and/or wake up the application processor, only to be discarded by the application processor because no application on the electronic device is listening for the unsolicited incoming packet. Unsolicited incoming packets may also be sent as malicious attacks from other electronic devices to exploit security vulnerabilities in software executing on the application processor. Consequently, the operation and/or use of electronic devices may be adversely impacted by the processing of unsolicited incoming packets on the electronic devices.

SUMMARY

The disclosed embodiments provide a system that processes incoming network packets to an electronic device. The system includes an analysis apparatus that maintains a list of accepted incoming packet attributes for the electronic device based on outgoing packets from the electronic device. The system also includes a management apparatus that uses the list to classify an incoming packet to the electronic device as a solicited incoming packet or an unsolicited incoming packet. If the incoming packet is classified as the solicited incoming packet, the management apparatus enables subsequent processing of the incoming packet on the electronic device. If the incoming packet is classified as the unsolicited incoming packet, the management apparatus adjusts a triggering of radio dormancy in the electronic device based on the incoming packet.

In some embodiments, the management apparatus also discards the incoming packet if the incoming packet is classified as the unsolicited incoming packet.

In some embodiments, classifying the incoming packet as the solicited incoming packet or the unsolicited incoming packet includes:

(i) obtaining a list of accepted incoming packet attributes for the electronic device;
(ii) comparing header information for the incoming packet to the list;
(iii) if the header information is included in the list, classifying the incoming packet as the solicited incoming packet; and
(iv) if the header information is not included in the list, classifying the incoming packet as the unsolicited incoming packet.

In some embodiments, adjusting the triggering of radio dormancy in the electronic device based on the incoming packet includes reducing an inactivity timer associated with the triggering of radio dormancy (e.g., fast dormancy) in the electronic device if the incoming packet is classified as the unsolicited incoming packet.

In some embodiments, adjusting the triggering of radio dormancy in the electronic device based on the incoming packet further includes adding information associated with the incoming packet to an unsolicited incoming packet history, and adjusting the inactivity timer based on the unsolicited incoming packet history.

In some embodiments, the information includes at least one of a statistic associated with the incoming packet and previous unsolicited incoming packets to the electronic device, and a timestamp associated with receipt of the incoming packet.

In some embodiments, the list includes at least one of a protocol, a source network address, a source port, a destination network address, and a destination port.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Data structures and code described in this detailed description are typically stored on a computer-readable storage medium, which may be any device or medium that can store code and/or data for use by an electronic device with computing capabilities. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that in the described embodiments, the computer-readable storage medium does not include non-statutory computer-readable storage mediums such as transmission signals.

The methods and processes described in this detailed description can be included in hardware modules. For example, the hardware modules can include, but are not limited to, processing subsystems, microprocessors, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits that are configured by executing instructions (program code, firmware, etc.) to perform the methods and processes.

The methods and processes described in the detailed description section can be embodied as code and/or data that can be stored in a computer-readable storage medium as described above. When an electronic device with computing capabilities reads and executes the code and/or data stored on the computer-readable storage medium, the electronic device performs the methods and processes embodied as data structures and code and stored within the computer-readable storage medium. For example, in some embodiments, a processing subsystem can read the code and/or data from a memory subsystem that comprises a computer-readable storage medium, and can execute code and/or use the data to perform the methods and processes.

In the following description, we refer to "some embodiments." Note that "some embodiments" describes a subset of all of the possible embodiments, but does not always specify the same subset of the embodiments.

Figure 1:
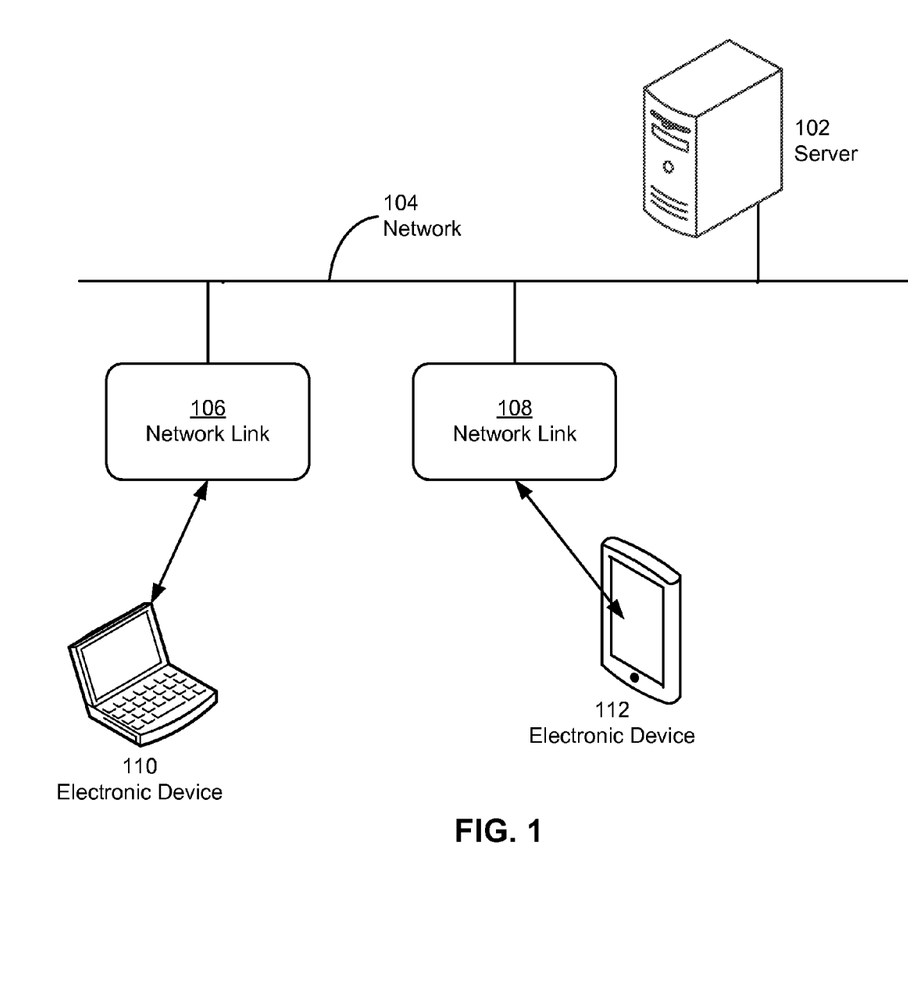
FIG. 1 shows a schematic of a system in accordance with the disclosed embodiments.

The disclosed embodiments provide a method and system for processing network packets. As shown in FIG. 1, a number of electronic devices 110-112 are connected to a network 104 through network links 106-108 provided by devices such as wireless access points, cell towers, and/or routers. Electronic devices 110-112 may correspond to personal computers, laptop computers, tablet computers, mobile phones, portable media players, and/or other network-enabled electronic devices. Network 104 may include a local area network (LAN), wide area network (WAN), personal area network (PAN), virtual private network, intranet, mobile phone network (e.g., a cellular network), WiFi network, Bluetooth network, universal serial bus (USB) network, Ethernet network, an ad hoc network formed between two or more devices, and/or other type of network that facilitates communication among electronic devices (e.g., electronic devices 110-112) connected to network 104.

In particular, electronic devices 110-112 may interact with one another and/or a server 102 on network 104 by sending and receiving data such as files, audio, video, and/or web content over network 104. For example, electronic device 110 may request data from electronic device 112 and server 102 by establishing Transmission Control Protocol (TCP) connections with electronic device 112 and server 102. Electronic device 112 and server 102 may provide the requested data by transmitting a sequence of packets containing the data over network 104 to electronic device 110. At the same time, electronic devices 110-112 and/or other electronic devices (not shown) may communicate with one another, server 102, and/or other servers (not shown) on network 104 by transmitting and receiving packets over network 104.

When electronic devices 110-112 are not actively communicating over network 104 and/or performing tasks for users of electronic devices 110-112, electronic devices 110-112 may enter a sleep (e.g., standby) mode, during which a number of components in electronic devices 110-112 are powered down to save power. Electronic devices 110-112 may then exit the sleep mode if user input and/or incoming network packets (e.g., from network 104) are received on electronic devices 110-112.

However, unsolicited incoming network packets to electronic devices 110-112 may waste power on electronic devices 110-112 and/or present a security risk to electronic devices 110-112. For example, an electronic device (e.g., electronic devices 110-112) may include an application processor that is powered down during the sleep mode and a baseband processor that transitions to a low-power state during the sleep mode to monitor a wireless network interface with a network link (e.g., network links 106-108) for incoming packets to the electronic device. An incoming packet received by the baseband processor over the wireless network interface may cause the baseband processor to transition to a higher-power state and trigger an exit from the sleep mode (e.g., a wake sequence) to enable processing of the incoming packet by the application processor. The application processor may then initialize drivers, schedule processes, and/or perform other tasks associated with the wake sequence before processing the incoming packet. Moreover, the application processor may discard the incoming packet if no application on the electronic device is listening for the incoming packet, resulting in unnecessary power consumption and a lack of useful work on the electronic device. The presence of the incoming packet in the application processor may further expose the operating system and/or applications on the electronic device to a malicious attack by another electronic device from which the incoming packet was received.

Figure 2:
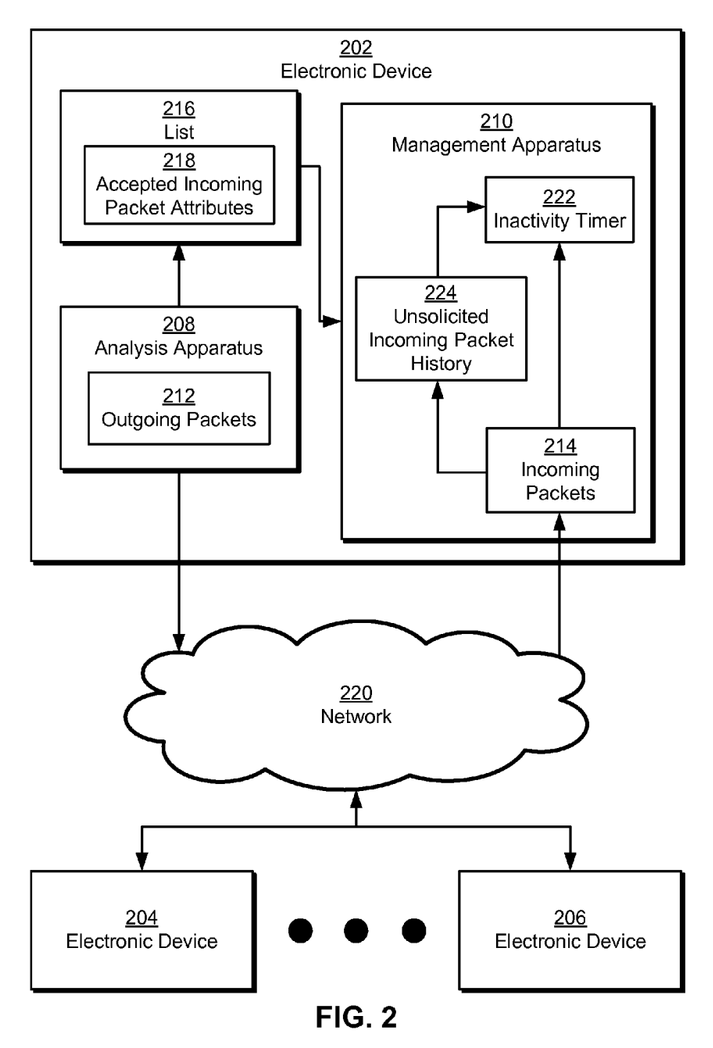
FIG. 2 shows a system for processing packets on an electronic device in accordance with the disclosed embodiments.

In one or more embodiments, electronic devices 110-112 include functionality to reduce power consumption associated with processing incoming packets. As shown in FIG. 2, a set of electronic devices 202-206 (e.g., personal computers, laptop computers, mobile phones, tablet computers, portable media players, servers, etc.) may be connected to one another through a network 220. In addition, electronic device 202 may communicate with electronic devices 204-206 by receiving incoming packets 214 from electronic devices 204-206 and sending outgoing packets 212 to electronic devices 204-206 over network 220.

Such networking capabilities on electronic device 202 may be provided by one or more components (e.g., processor cores, baseband processor, application processor, etc.) that implement a network stack on electronic device 202. For example, a baseband processor on electronic device 202 may manage the physical and/or data link layers of the network stack, an application processor on electronic device 202 may manage the transport and/or application layers of the network stack, and either the baseband or application processors may manage the network layer of the network stack.

As shown in FIG. 2, one or more components of electronic device 202 may also provide an analysis apparatus 208 and/or a management apparatus 210. Analysis apparatus 208 may maintain a list 216 of accepted incoming packet attributes 218 for electronic device 202 based on outgoing packets 212 (e.g., Internet Protocol (IP) packets) from electronic device 202. Management apparatus 210 may use list 216 in processing incoming packets 214 to electronic device 202 by classifying each of the incoming packets as a solicited incoming packet or an unsolicited incoming packet. Management apparatus 210 may also adjust a radio dormancy of a radio (e.g., a cellular radio) in electronic device 202 based on the receipt of unsolicited incoming packets by electronic device 202.

In particular, analysis apparatus 208 may maintain list 216 based on a set of services associated with incoming packets 214 to electronic device 202. The services may utilize incoming packets associated with certain attributes to perform tasks on electronic device 202. For example, the services may obtain data from electronic devices 204-206, process the data on electronic device 202, and/or provide the data to a user of electronic device 202. In addition, the data may be sent using incoming packets 214 from specific ports and/or IP addresses and/or ranges of port numbers and/or IP addresses. To enable use of the incoming packets by the services, analysis apparatus 208 may obtain the IP addresses and/or ports from the services and add the IP addresses and/or ports as accepted incoming packet attributes 218 to list 216, and filtering apparatus 210 may allow packets that match the IP addresses and/or ports to reach the services. Such inclusion of accepted incoming packet attributes 218 associated with services on electronic device 202 may allow the services to act as listeners for connections and/or communications initiated by electronic devices 204-206.

Analysis apparatus 208 may also actively update list 216 by analyzing header information for each outgoing packet (e.g., outgoing packets 212) from electronic device 202. The header information may be obtained from one or more protocol headers in the outgoing packet. For example, the header information may include source and destination network (e.g., IP) addresses, source and destination ports, protocols, flags, and/or other information from the IP, Transmission Control Protocol (TCP), and/or User Datagram Protocol (UDP) headers in the outgoing packet.

If the header information is associated with a new socket pair, analysis apparatus 208 may add the header information as one or more accepted incoming packet attributes to list 216. If the header information is associated with a closed socket pair, analysis apparatus 208 may remove the header information from list 216. If the header information is not associated with either the new socket pair or the closed socket pair, analysis apparatus 208 may not modify list 216 based on the header information. Maintaining lists of accepted incoming packet attributes is discussed in further detail in a co-pending non-provisional application by the same inventors as the instant application and filed on the same day as the instant application, entitled "Filtering of Unsolicited Incoming Packets to Electronic Devices," having Ser. No. 13/627,888, and filing date Sep. 26, 2012, which is incorporated herein by reference.

Once list 216 is available to management apparatus 210, management apparatus 210 may use list 216 to classify incoming packets 214 as solicited or unsolicited. More specifically, management apparatus 210 may classify incoming packets that match accepted incoming packet attributes 218 in list 216 as solicited incoming packets. Management apparatus 210 may also enable subsequent processing of the solicited incoming packets by, for example, providing the incoming packets to a transport-layer mechanism that manages the transport layer of the network stack on electronic device 202. The transport-layer mechanism may then route the solicited incoming packets to applications on electronic device 202 so that the applications may use the data in the solicited incoming packets to perform tasks for the user of electronic device 202.

On the other hand, management apparatus 210 may classify all incoming packets that are not associated with ports used by services on electronic device 202 or socket pairs used by existing TCP connections and/or UDP communications on electronic device 202 as unsolicited incoming packets. Management apparatus 210 may also classify incoming packets associated with the Internet Control Message Protocol (ICMP) (e.g., ping packets) as unsolicited incoming packets. Management apparatus 210 may then discard the unsolicited incoming packets and adjust the triggering of radio dormancy in electronic device 202 based on the receipt of the unsolicited incoming packets.

In one or more embodiments, management apparatus 210 adjusts the radio dormancy in electronic device 202 by adjusting an inactivity timer 222 used to trigger the radio dormancy. Inactivity timer 222 may specify a period of inactivity for which a radio on electronic device 202 (e.g., cellular radio, WiFi radio, etc.) is maintained in an active state after a last packet is transmitted from and/or received by the radio to enable subsequent transmission and/or receipt of follow-up packets (e.g., outgoing packets 212, incoming packets 214) to the last packet by the radio. As a result, the radio may be maintained in the active state until the period denoted by inactivity timer 222 expires without the transmission or receipt of a packet by the radio.

Once inactivity timer 222 expires, may transition from the active state to a low-power state, in which the radio is "dormant" and one or more components of the radio operate at lower power and/or reduced clock speeds. For example, the counting down of inactivity timer 222 may trigger a fast-dormancy state transition from a dedicated-channel state (e.g., CELL_DCH) in a mobile phone to a lower-power paging-channel state (e.g., idle, CELL_PCH, URA_PCH). While the radio is in the low-power and/or "dormant" state, the radio may use discontinuous reception to periodically check a paging indicators channel and/or paging channel on network 220 to determine if electronic device 202 has incoming packets 214. If the paging indicators and/or paging channel indicate that electronic device 202 has incoming packets 214, the radio may transition back to the active state to receive incoming packets 214.

If an incoming packet is classified as unsolicited, management apparatus 210 may reduce inactivity timer 222 to trigger radio dormancy (e.g., fast dormancy) more quickly on electronic device 202 because the incoming packet is unlikely to result in subsequent communication between electronic device 202 and the sender of the incoming packet (e.g., electronic devices 204-206). For example, management apparatus 210 may set inactivity timer 222 to trigger radio dormancy after 1-2 seconds of inactivity instead of after 5-10 seconds of inactivity. Such expediting of radio dormancy may reduce power consumption in electronic device 202 without causing unnecessary delays (e.g., Radio Access Bearer (RAB) activation delays) associated with receiving follow-up solicited incoming packets from other senders on network 220.

Management apparatus 210 may further adjust inactivity timer 222 based on historical information associated with incoming packets 214. As shown in FIG. 2, management apparatus 210 may add information associated with each unsolicited incoming packet to an unsolicited incoming packet history 224. The information may include a statistic associated with the unsolicited incoming packet and previous unsolicited incoming packets to the electronic device and/or a timestamp associated with receipt of the unsolicited incoming packet. For example, unsolicited incoming packet history 224 may store statistics and/or summary statistics related to the frequency with which unsolicited incoming packets are received by electronic device 202 and/or timestamps for a number (e.g., 10, 20, 100, etc.) and/or period (e.g., 5 seconds, 10 seconds, etc.) of the most recently received unsolicited incoming packets.

Management apparatus 210 may then adjust inactivity timer 222 based on unsolicited incoming packet history 224. For example, management apparatus 210 may detect that unsolicited incoming packets are received at frequent intervals (e.g., every two seconds) and increase inactivity timer 222 to prevent the radio on electronic device 202 from repeatedly transitioning between the active and low-power states and/or establishing and tearing down a channel with network 220 as a result of the unsolicited incoming packets. In addition, management apparatus 210 may gradually increase or decrease inactivity timer 222 based on a historical pattern of incoming packets 214 (e.g., a proportion of unsolicited to solicited packets, a frequency of unsolicited packets, etc.). For example, management apparatus 210 may increment or decrement inactivity timer 222 by pre-determined steps (e.g., 1 second, 2 seconds, etc.) after receiving a given number, proportion, type, and/or frequency of unsolicited incoming packets.

Finally, management apparatus 210 may also set and/or adjust inactivity timer 222 based on the type of network 220 to which electronic device 202 is connected. For example, management apparatus 210 may set inactivity timer 222 to trigger radio dormancy in electronic device 202 differently on a code division multiple access (CDMA) network than on a Universal Mobile Telecommunications System (UMTS) network.

By providing a system that identifies and discards unsolicited incoming packets before the unsolicited incoming packets pass through the network stack on electronic device 202, analysis apparatus 208 and management apparatus 210 may reduce unnecessary processing of the unsolicited incoming packets and mitigate security risks associated with accepting the unsolicited incoming packets on electronic device 202. In addition, adjustments to inactivity timer 222 based on the unsolicited incoming packets may further reduce the power consumption of electronic device 202 by preventing the unsolicited incoming packets from needlessly triggering exits from sleep modes and/or delaying periods of radio dormancy on electronic device 202.

Those skilled in the art will appreciate that the system of FIG. 2 may be implemented in a variety of ways. First, as described above, analysis apparatus 208 and management apparatus 210 may be provided by the same software and/or hardware component, or analysis apparatus 208 and management apparatus 210 may execute independently from one another. For example, analysis apparatus 208 and management apparatus 210 may be implemented using different combinations of an application processor, a baseband processor, a multi-core processor, a single-core processor, an operating system kernel, a standalone application, and/or a driver. Analysis apparatus 208 and management apparatus 210 may further be implemented by a network node in network 220 to which electronic device 202 is connected, such as a router, wireless access point, and/or cellular tower.

Second, analysis apparatus 208 and management apparatus 210 may process incoming packets 214 from a variety of network connections. For example, analysis apparatus 208 may create list 216 based on outgoing packets 212 transmitted over a cellular network connection, WiFi connection, Bluetooth (Bluetooth™ is a registered trademark of Bluetooth SIG, Inc.) connection, wired network connection, and/or other type of network connection. Management apparatus 210 may then use list 216 to classify incoming packets 214 and/or adjust inactivity timer 222 based on the classified incoming packets 214 from the same type of network connection.

Figure 3:
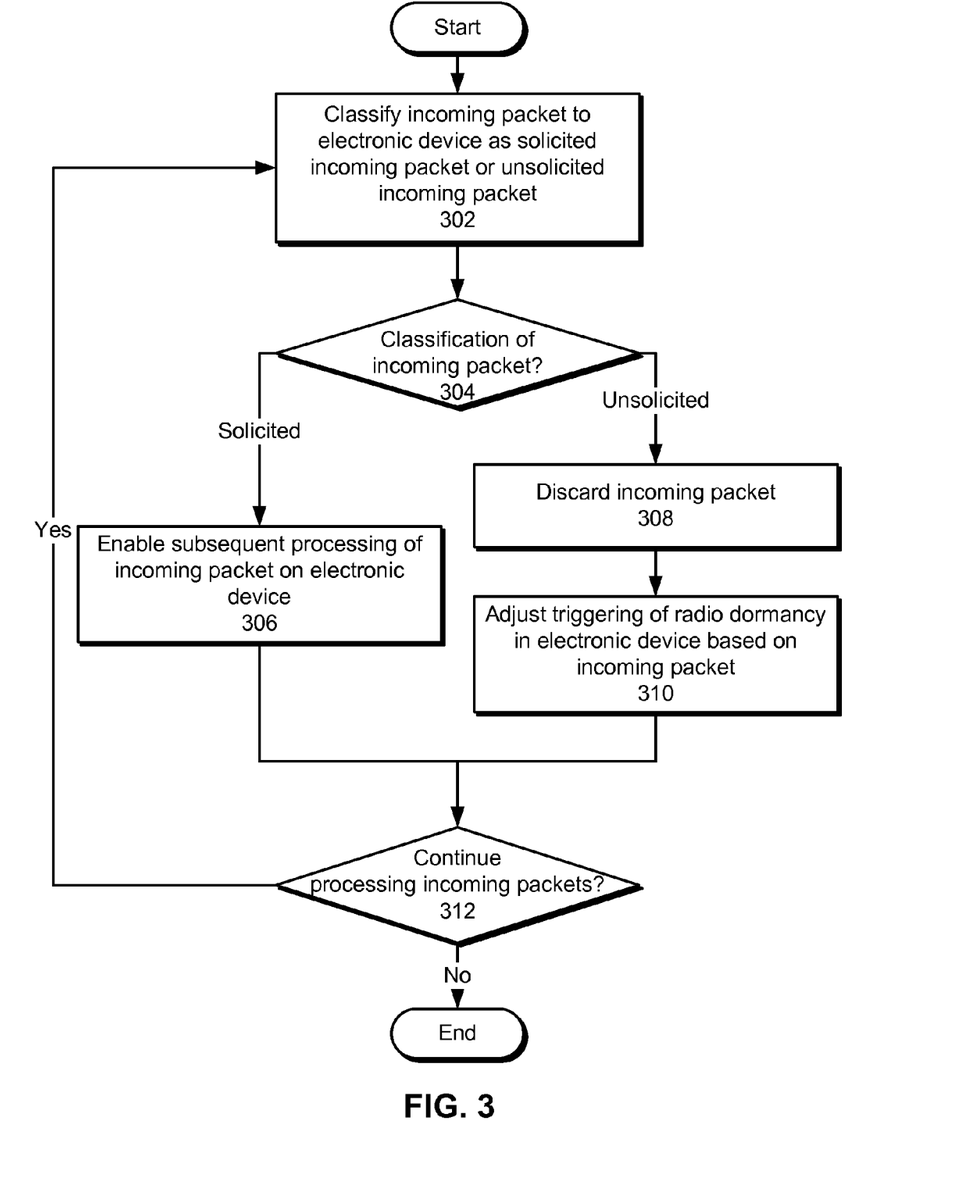
FIG. 3 shows a flowchart illustrating the processing of incoming network packets to an electronic device in accordance with the disclosed embodiments.

FIG. 3 shows a flowchart illustrating the processing of incoming network packets to an electronic device in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, an incoming packet to the electronic device is classified as a solicited incoming packet or an unsolicited incoming packet (operation 302). To classify the incoming packet, a list of accepted incoming packet attributes for the electronic device is obtained, and header information for the incoming packet is compared to the list. For example, the list may be examined for an entry containing the protocol, source network address, source port, destination network address, and/or destination port from the header information. If the header information is included in the list, the incoming packet is classified as a solicited incoming packet. Conversely, if the header information is not included in the list, the incoming packet is classified as an unsolicited incoming packet.

The incoming packet may then be processed based on the classification (operation 304). If the incoming packet is classified as solicited, subsequent processing of the incoming packet on the electronic device is enabled (operation 306). For example, the incoming packet may be provided to a transport-layer mechanism that manages the transport layer of a network stack on the electronic device for subsequent processing of the incoming packet by the transport-layer mechanism and/or an application on the electronic device.

If the incoming packet is classified as unsolicited, the incoming packet may be discarded (operation 308) to preclude further processing of the packet on the electronic device. Such discarding of the incoming packet may reduce the processing overhead and/or power consumption of the electronic device. For example, the incoming packet may be discarded before the incoming packet is processed further by one or more layers of the network stack and/or triggers an exit from a sleep mode on the electronic device. Discarding of the incoming packet before the incoming packet reaches the upper layers of the network stack may further reduce the security risk associated with a malicious attack by a sender of the incoming packet.

In addition, the triggering of radio dormancy in the electronic device is adjusted based on the incoming packet (operation 310). For example, an inactivity timer associated with the triggering of radio dormancy in the electronic device may be reduced if the incoming packet is classified as the unsolicited incoming packet to expedite the return of the radio to a low-power state. Information associated with the incoming packet (e.g., statistics, timestamps, etc.) may also be added to an unsolicited incoming packet history of previously received unsolicited incoming packets, and the inactivity timer may be adjusted based on the unsolicited incoming packet history.

Processing of incoming packets may continue (operation 312). If processing of the incoming packets is to continue, each incoming packet is classified as solicited or unsolicited (operations 302-304), and the incoming packet is handled based on the classification (operations 306-310). Such processing may continue until the electronic device is switched off, classification of incoming packets to the electronic device is disabled, and/or incoming packets are no longer received by the electronic device.

Figure 4:
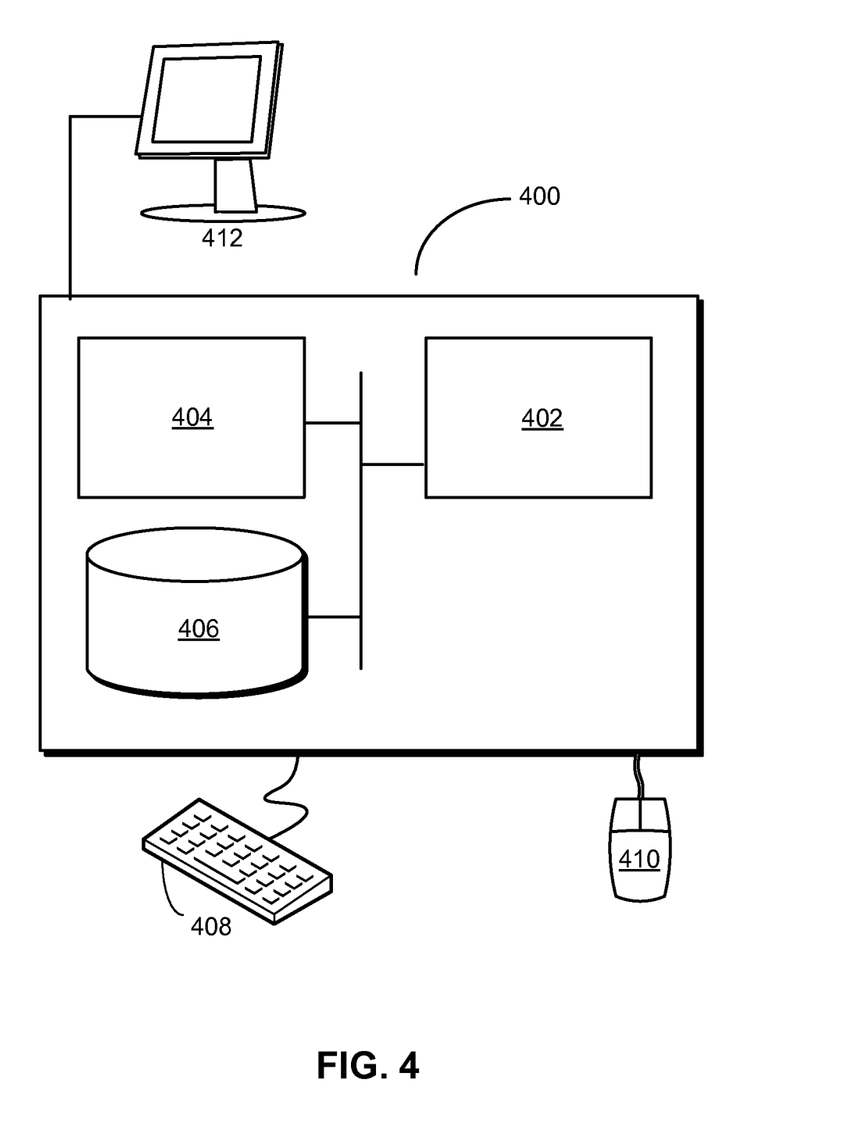
FIG. 4 shows a computer system in accordance with the disclosed embodiments.

FIG. 4 shows a computer system 400 in accordance with the disclosed embodiments. Computer system 400 may correspond to an apparatus that includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for processing incoming network packets to an electronic device. The system may include an analysis apparatus that maintains a list of accepted incoming packet attributes for the electronic device based on outgoing packets from the electronic device. The system may also include a management apparatus that uses the list to classify an incoming packet to the electronic device as a solicited incoming packet or an unsolicited incoming packet. If the incoming packet is classified as the solicited incoming packet, the management apparatus may enable subsequent processing of the incoming packet on the electronic device. If the incoming packet is classified as the unsolicited incoming packet, the management apparatus may discard the incoming packet and adjust a triggering of radio dormancy in the electronic device based on the incoming packet.

In addition, one or more components of computer system 300 may be remotely located and connected to the other components over a network. Portions of the present embodiments (e.g., analysis apparatus, management apparatus, etc.) may also be located on different nodes of a distributed system that implements the embodiments. For example, the present embodiments may be implemented using a cloud computing system that analyzes outgoing packets, processes incoming packets, and adjusts radio dormancies for a set of remote electronic devices based on the processed incoming packets.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for processing incoming network packets to an electronic device, comprising:
    in a baseband processor in the electronic device, performing operations for:
        classifying an incoming packet to the electronic device as a solicited incoming packet or an unsolicited incoming packet based at least in part on at least one of a source network address, a source port, a destination address, and a destination port from the incoming packet, wherein an application processor in the electronic device remains powered down as the baseband processor classifies the incoming packet;
        in response to the incoming packet being classified as the solicited incoming packet, causing the application processor to power up to process the incoming packet;
        in response to the incoming packet being classified as the unsolicited incoming packet, adding information associated with the incoming packet to an unsolicited incoming packet history; and
        adjusting a triggering of radio dormancy in the electronic device based at least in part on the classification of the incoming packet.

2. The method of claim 1, further comprising:
    discarding the incoming packet in response to the incoming packet being classified as the unsolicited incoming packet.

3. The method of claim 1, wherein classifying the incoming packet as the solicited incoming packet or the unsolicited incoming packet comprises:
    obtaining a list of accepted incoming packet attributes for the electronic device;
    comparing header information for the incoming packet to the list;
    in response to the header information being included in the list, classifying the incoming packet as the solicited incoming packet; and
    in response to the header information not being included in the list, classifying the incoming packet as the unsolicited incoming packet.

4. The method of claim 1, wherein adjusting the triggering of radio dormancy in the electronic device comprises:
reducing an inactivity timer associated with the triggering of radio dormancy in the electronic device in response to the incoming packet being classified as the unsolicited incoming packet.

5. The method of claim 4, wherein adjusting the triggering of radio dormancy in the electronic device further comprises:
adjusting the inactivity timer based at least in part on the unsolicited incoming packet history.

6. The method of claim 1, wherein the information associated with the incoming packet comprises at least one of:
a statistic associated with the incoming packet and previous unsolicited incoming packets to the electronic device; and
a timestamp associated with receipt of the incoming packet.

7. A system for processing incoming network packets to an electronic device, comprising:
an analysis apparatus configured to maintain a list of accepted incoming packet attributes for the electronic device based at least in part on outgoing packets from the electronic device, wherein the list comprises source network addresses, source ports, destination addresses, and destination ports; and
a baseband processor in the electronic device that performs operations for a management apparatus, the operations comprising:
using the list to classify an incoming packet to the electronic device as a solicited incoming packet or an unsolicited incoming packet based on at least one of a source network address, a source port, a destination address, and a destination port from the incoming packet, wherein an application processor in the electronic device remains powered down as the baseband processor classifies the incoming packet;
in response to the incoming packet being classified as the solicited incoming packet, causing the application processor to power up to process the incoming packet;
in response to the incoming packet being classified as the unsolicited incoming packet, adding information associated with the incoming packet to an unsolicited incoming packet history; and
adjusting a triggering of radio dormancy in the electronic device based at least in part on the classification of the incoming packet.

8. The system of claim 7, wherein the operations of the management apparatus performed by the baseband processor further comprise:
discarding the incoming packet in response to the incoming packet being classified as the unsolicited incoming packet.

9. The system of claim 7, wherein using the list to classify the incoming packet as the solicited incoming packet or the unsolicited incoming packet comprises:
comparing header information for the incoming packet to the list;
in response to the header information being included in the list, classifying the incoming packet as the solicited incoming packet; and
in response to the header information not being included in the list, classifying the incoming packet as the unsolicited incoming packet.

10. The system of claim 7, wherein adjusting the triggering of radio dormancy in the electronic device comprises:
reducing an inactivity timer associated with the triggering of radio dormancy in the electronic device in response to the incoming packet being classified as the unsolicited incoming packet.

11. The system of claim 10, wherein adjusting the triggering of radio dormancy in the electronic device comprises:
adjusting the inactivity timer based at least in part on the unsolicited incoming packet history.

12. The system of claim 7, wherein the information associated with the incoming packet comprises at least one of:
a statistic associated with the incoming packet and previous unsolicited incoming packets to the electronic device; and
a timestamp associated with receipt of the unsolicited incoming packet.

13. A non-transitory computer-readable storage medium storing instructions that when executed by a baseband processor in a computer cause the baseband processor in the computer to perform a method for processing incoming network packets to an electronic device, the method comprising:
classifying an incoming packet to the electronic device as a solicited incoming packet or an unsolicited incoming packet based at least in part on at least one of a source information and a destination information, wherein an application processor in the computer remains powered down as the baseband processor classifies the incoming packet;
in response to the incoming packet being classified as the solicited incoming packet, causing the application processor to power up to process the incoming packet; and
in response to the incoming packet being classified as the unsolicited incoming packet, adding information associated with the incoming packet to an unsolicited incoming packet history; and
adjusting a triggering of radio dormancy in the electronic device based at least in part on the classification of the incoming packet.

14. The non-transitory computer-readable storage medium of claim 13, the method further comprising:
discarding the incoming packet in response to the incoming packet being classified as the unsolicited incoming packet.

15. The non-transitory computer-readable storage medium of claim 13, wherein classifying the incoming packet as the solicited incoming packet or the unsolicited incoming packet comprises:
obtaining a list of accepted incoming packet attributes for the electronic device;
comparing header information for the incoming packet to the list;
in response to the header information being included in the list, classifying the incoming packet as the solicited incoming packet; and
in response to the header information not being included in the list, classifying the incoming packet as the unsolicited incoming packet.

16. The non-transitory computer-readable storage medium of claim 13, wherein adjusting the triggering of radio dormancy in the electronic device comprises:
reducing an inactivity timer associated with the triggering of radio dormancy in the electronic device in response to the incoming packet being classified as the unsolicited incoming packet.

17. The non-transitory computer-readable storage medium of claim 16, wherein adjusting the triggering of radio dormancy in the electronic device further comprises:
   adjusting the inactivity timer based at least in part on the unsolicited incoming packet hi story.

18. The non-transitory computer-readable storage medium of claim 13, wherein the information associated with the incoming packet comprises at least one of:
   a statistic associated with the incoming packet and previous unsolicited incoming packets to the electronic device; and
   a timestamp associated with receipt of the incoming packet.

19. The method of claim 1, wherein the radio dormancy comprises causing a radio component of the electronic device to operate at low power or causing the radio component to operate at a reduced clock speed.

20. The system of claim 7, wherein the radio dormancy comprises causing a radio component of the electronic device to operate at low power or causing the radio component to operate at a reduced clock speed.

* * * * *

UNITED STATES PATENT AND TRADEMARK OFFICE
CERTIFICATE OF CORRECTION

PATENT NO. : 9,549,372 B2
APPLICATION NO. : 13/627898
DATED : January 17, 2017
INVENTOR(S) : Vyas et al.

Page 1 of 1

It is certified that error appears in the above-identified patent and that said Letters Patent is hereby corrected as shown below:

In the Claims

Claim 17, Column 13, Line 5, "packet hi story" should read --packet history--.

Signed and Sealed this
Tenth Day of April, 2018

Andrei Iancu
*Director of the United States Patent and Trademark Office*